United States Patent [19]

Hertsius et al.

[11] 4,082,023
[45] Apr. 4, 1978

[54] CABLE CUTTER

[75] Inventors: Lars-Olov Hertsius, Bromma; Anders Arneborn, Taby, both of Sweden

[73] Assignee: Telefonaktiebolaget L M Ericsson, Stockholm, Sweden

[21] Appl. No.: 798,766

[22] Filed: May 20, 1977

[30] Foreign Application Priority Data

Jun. 22, 1976 Sweden .................. 7607166

[51] Int. Cl.$^2$ ................ B23D 25/12; B26D 5/24
[52] U.S. Cl. ........................... 83/293; 83/344; 83/369
[58] Field of Search ............ 83/287, 293, 294, 295, 83/344, 369, 522

[56] References Cited

U.S. PATENT DOCUMENTS

| 3,523,392 | 8/1970 | Carl | 83/369 X |
| 3,803,962 | 4/1974 | Koslow | 83/293 X |

*Primary Examiner*—J. M. Meister
*Attorney, Agent, or Firm*—Hane, Roberts, Spiecens & Cohen

[57] ABSTRACT

A device for measuring and cutting cables in chosen lengths at its rerolling for delivery which device comprises rotatable cutting tools, a measuring wheel and a grip-and-pulling-wheel, where the grip-and-pulling-wheel when pulling the cable is connected to a clutch mechanism arranged to be electromagnetically set either to let the grip-and-pulling-wheel pull the cable and to prevent backward motion of the cable or to allow motion of the cable both forwards and backwards.

1 Claim, 4 Drawing Figures

CABLE CUTTER

The present invention refers to an arrangement to measure and cut a cable or the like in chosen lengths when rerolling it for delivery, said arrangement comprising rotatable cutting tools, a measuring wheel and a grip-and-pulling-wheel which is pressed against the measuring wheel.

In known arrangements to measure and cut cable and the like in chosen lengths there are arranged in a row among other things an unroller for the cable to be measured and cut, a length gauge for the cable, a cable cutter combined with two wheels for pulling the cable forwards and a cable take up machine to take up the cut cable either on a cable drum or in a ring without a cable drum. The cable cutter is provided with two knives, one on each of two wheels with parallel axes, between which the cable passes; a cutter having this principle design is known for example from the Swedish Pat. No. 98,399. At the known cable cutter the two wheels which pull the cable forwards are brought to press against the cable only when the cutting wheels are started in order to cut the cable, otherwise the wheels which are pulling the cable forwards are separated so that the cable can run freely between them.

At the cable cutter according to the invention especially the forward pulling arrangement is arranged in a way which appears from the following claim.

With the cable cutter according to the invention it is achieved that the arrangements for the rerolling of the cable as a whole become simpler and cheaper than before and that they occupy less space of the cable factory than arrangements used earlier for this purpose.

Figure 2:
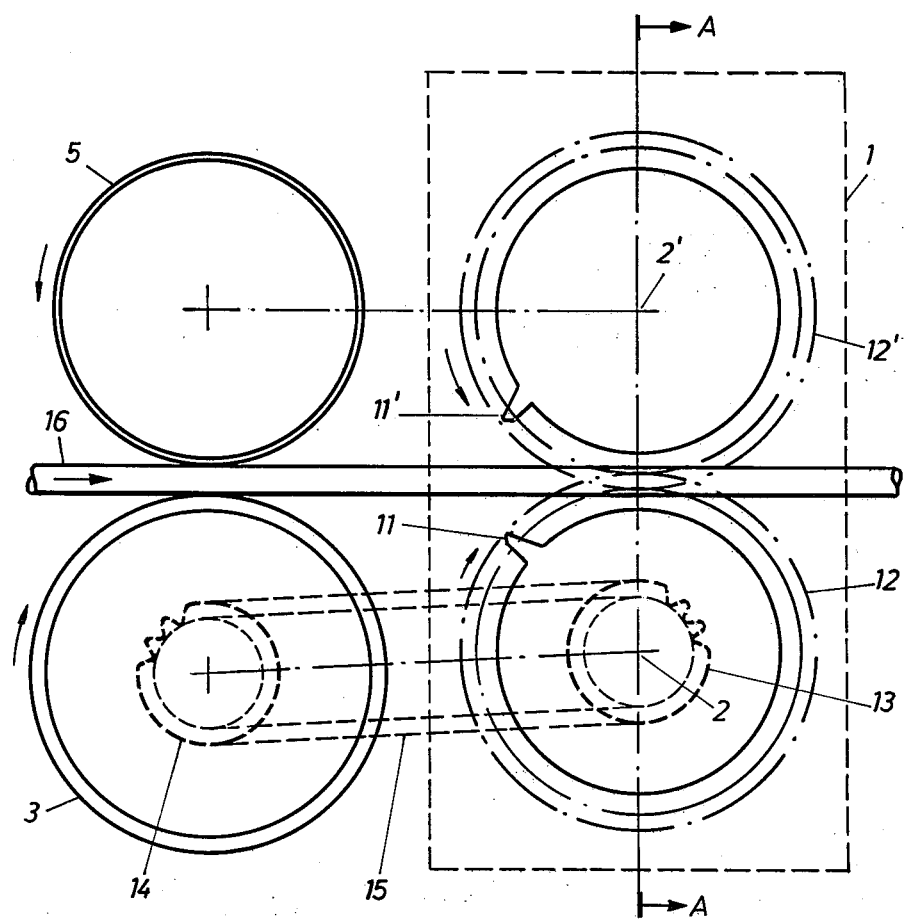
Figure 3:
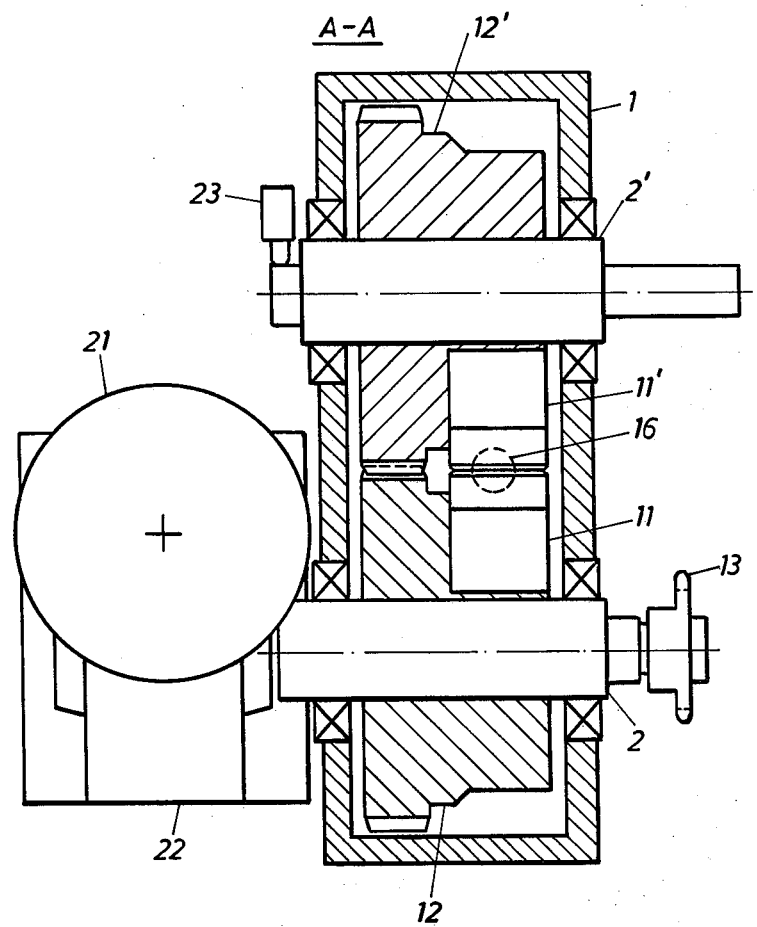

Below an embodiment of a cable cutter according to the present invention is described with reference to the appended drawing which shows in FIG. 1 the outer parts of a cable cutter and measuring wheels and cable pulling wheels cooperating with the cable cutter, FIG. 2 the cable cutter and the driving of the cable pulling wheel, FIG. 3 a section of the cable cutter and FIG. 4 a section of a clutch arrangement at the cable pulling wheel.

Figure 1:
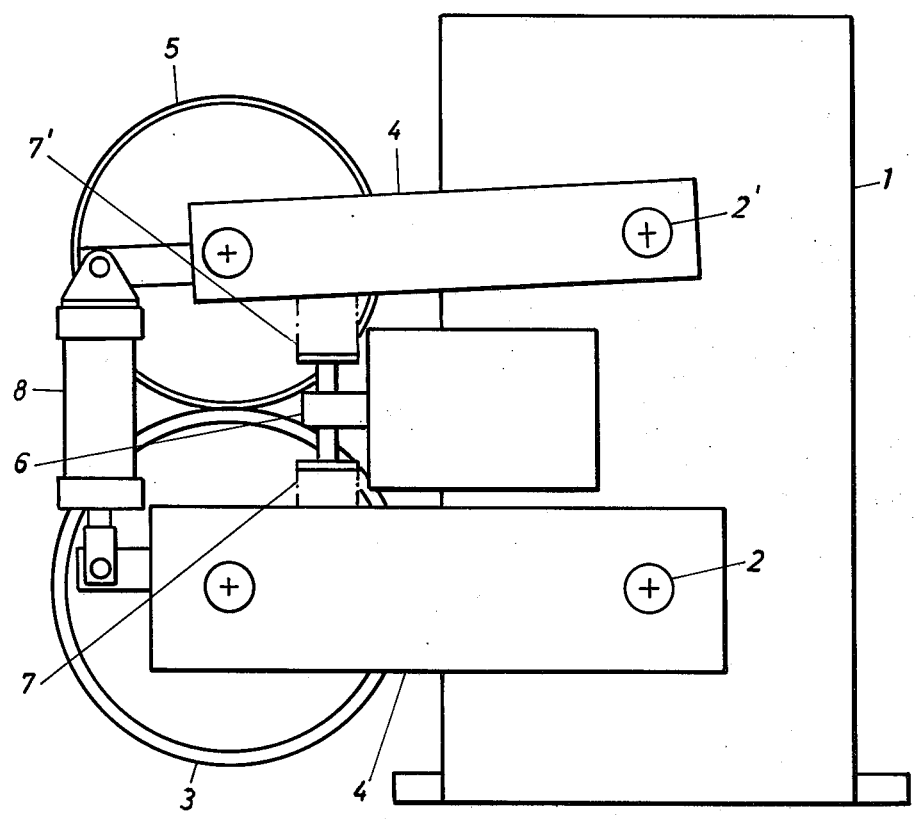

A cable cutter according to the invention includes, as appears from FIG. 1, a casing 1 enclosing two cutting tools which are arranged to be able to rotate around the axes 2 and 2'. Furthermore the cable cutter comprises a grip-and-pulling-wheel 3 which is placed on an arm 4 being hinged around the axis 2 and a measuring wheel 5 which is placed on a second arm 4' being hinged around the axis 2'. On a support 6 which is firmly united with the casing two pressure springs 7 and 7' are supported and arranged to keep the arms 4 and 4' apart. A cylinder 8 having an air driven piston unites the two arms and is arranged to bring the arms and consequently also the two wheels 3 and 5 closer to each other when compressed air is brought to the cylinder.

The cable cutter proper shows two cutting tools 11 and 11' which are fastened on two identical cog-wheels 12 and 12' which are carried by said axes 2 and 2'. The axis 2' furthermore carries a chain wheel 13 and over this chain wheel and an identical chain wheel 14 which is arranged concentric with the grip-and-pulling-wheel 3, a roller chain 15 is placed. The chain wheel 14 is united with the grip-and-pulling-wheel 3 by means of a clutch which is described in detail below.

A cable 16 which is to be measured and cut is placed to pass between the wheels 3 and 5 and between the two cutting tools 11 and 11'. A motor 21, as it appears from the section through the cable cutter in FIG. 3, is arranged when cutting the cable to drive over a worm gear 2 the axis 2 and thus the cog wheels 12 and 12' carrying the cutting tools and the chain wheel 13. A limit switch 23 is arranged at the axis 2' to cooperate with electrical circuits which are not especially shown in order to keep the cutting tools 11 and 11' standing in the position which is shown in FIG. 2.

Figure 4:
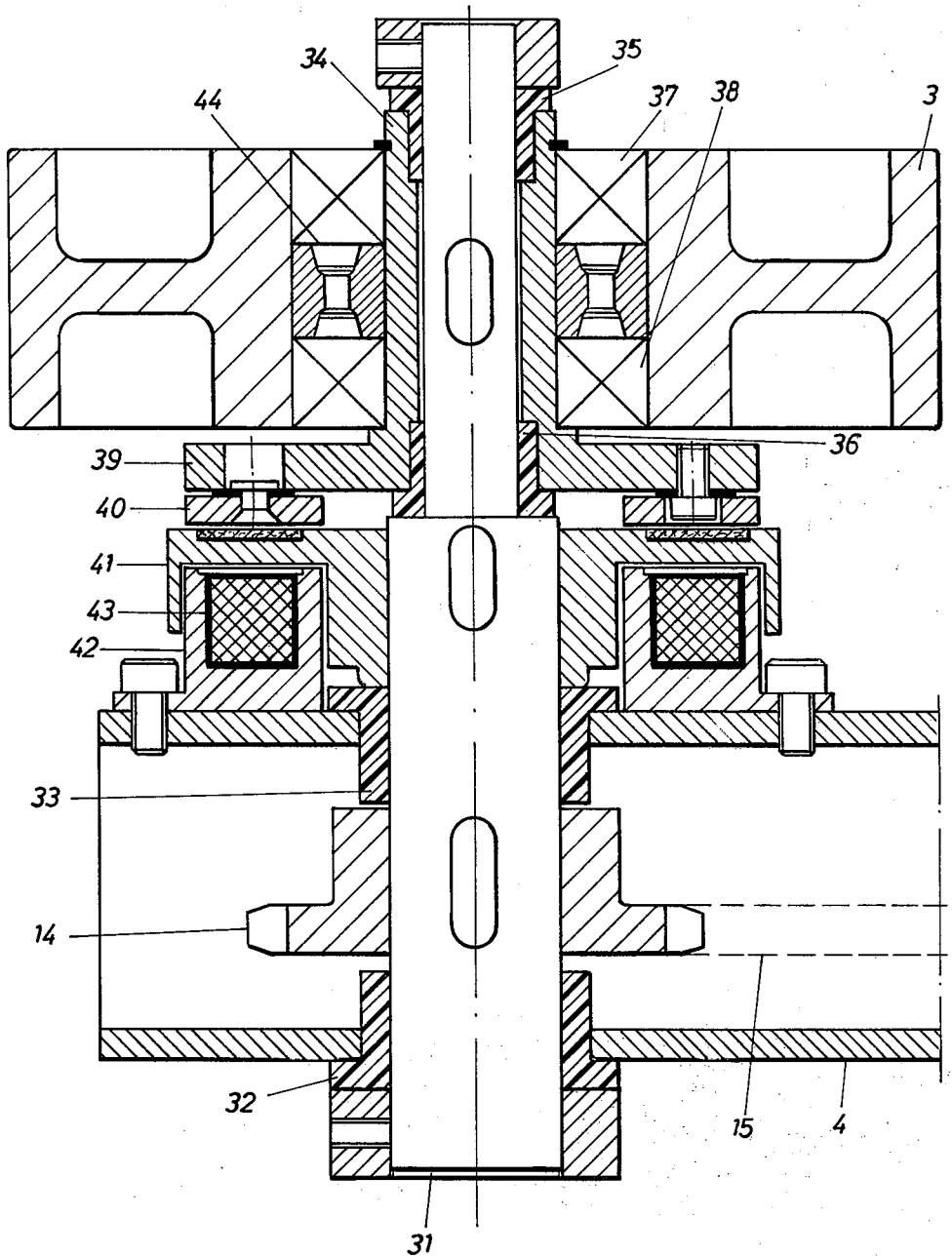

The chain wheel 14 at the grip-and-pulling-wheel 3, as appears from FIG. 4, is keyed to an axis 31. The axis 31 is pivoted in two bearings 32 and 33 in the above mentioned arm 4. Furthermore on the axis 31 a sleeve 34 is pivoted in two bearings 35 and 36. The earlier mentioned grip-and-pulling-wheel 3 on its part is pivoted on the sleeve 34 by means of two ball bearings 37 and 38. In one of its ends the sleeve 34 is formed to a flange 39. A ring shaped magnetic yoke 40 which is included in an electro-magnetic clutch is riveted to the flange. In the clutch there are also a clutch ring 41 which is keyed to the axis 31 and which follows the axis in its rotation and a magnet core 42 which comprises a magnetizing winding 43 and which is fastened with screws to the arm 4. When magnetizing the winding 43 the yoke 40 becomes firmly united with the clutch ring 41 which finally results in that the sleeve 34 becomes firmly united with the axis 31 and follows its rotation. When the magnetization ceases the sleeve 34 is free to be turned in all directions compared to the axis 31.

A ratchet coupling 44 is arranged between the two ball bearings 37 and 38 for the grip-and-pulling-wheel 3. The ratchet coupling is arranged in such a way that it allows the wheel 3 to be turned compared to the axis 31 only in the direction corresponding to the forward direction of the cable, i.e. in the direction being marked with an arrow at the wheel 3 in FIG. 2. The ratchet coupling is of a kind known per se and is not considered necessary to describe in detail.

A cable unroller and a cable take up machine are also arranged together with the cable cutter which is described here. The cable unroller is arranged to unroll cable from a cable drum onto which the cable has been reeled at the manufacturing and the cable take up machine is arranged to take up the measured and cut cable either on a cable drum or to a ring without a cable drum. The cable unroller and the cable take up machine can be of any kind known per se and therefore it is not considered necessary to describe them in detail.

The cable cutter according to the invention works in the following way: The cable is pulled from the cable unroller, is passed between the grip-and-pulling-wheel 3 and the measuring wheel 5 and between the cutting tools 11 and 11', see FIG. 2, and is fastened at the cable take up machine. At the control device of the cable cutter, which is not shown, the intended length of cable is set. In this stage the magnetic coupling at the grip-and-pulling-wheel 3 is unmagnetized why the wheel and consequently the cable are free to be moved in the forward direction of the cable, which is shown by an arrow at the cable 16 in FIG. 2, and also in the opposite direction. The pulling forward is started and the cable is accelerated to a chosen forward pulling speed.

When 10 meters remain until the intended length of the cable has passed the cable cutter the decrease of the forward pulling speed is begun so that this is only low when the end of the intended cable length passes the measuring wheel 5. The uniting force on the wheels 5 and 3 from the compressed air cylinder 8, which during the early pulling process has been only low, is increased immediately before the cable is to be cut. At the same time as the contracting force from the compressed air cylinder 8 is increased current is connected to the magnetizing winding 43 in the magnetic clutch, see FIG. 4. In this way the sleeve 34 becomes firmly united with the axis 31. When the intended length of the cable passes the measuring wheel the motor 21 is started so that the cog wheels 12 and 12' with the cutting tools 11 and 11' are set in motion in the direction of the arrows, see FIG. 2, and the cable is cut when the cutting tools meet on the centre line which unites the axes 2 and 2'. The cog wheels execute one complete turn and the motor stops again when the cutting tools take the position shown in FIG. 2. At the same time as the cog wheels 12 and 12' are set in motion by the motor 21 also the cog wheel 13, the chain 15, the chain wheel 14 and the axis 31 are set in motion. As the sleeve 34 is firmly united with the axis 31 by the magnetic clutch the grip-and-pulling-wheel 3 will be forced to turn by the ratchet coupling 44 in such a direction that it pulls the cable in its forward direction with the same speed as the cutting tools 11 pull the cable forwards when they have gripped the cable. The unevenness in the forward movement of the cable which arises from the fact that the movement of the cutting tools is circular and not linear is smoothened by means of a sliding in the allowed sliding direction of the ratchet coupling.

When the cable has been cut the cable being pulled forwards from the cable unroller is prevented from being pulled backwards out of the cable cutter due to the fact that it is pressed between the two wheels 3 and 5 and the wheel 3 in the ratchet coupling 44 is prevented from rotating backwards. As all said wheels which are driven by the motor are arranged to make one complete turn the pulling forwards of the cable also continues after it has been cut until about 0.5 m of the cable protrudes from the cable cutter in the direction towards the cable take up machine. When the cut cable has been removed from the cable take up machine and this is ready to receive a new length of cable then the cable end which is protruding is seized by hand and the cable is pulled forwards in the forward direction of the ratchet coupling and is fastened at the cable take up machine. The magnetizing current to the magnet coupling is then disconnected at the same time as the compressed air cylinder 8 is adjusted for only a light pressing force between the grip-and-pulling-wheel 3 and the measuring wheel 5 after which the rolling forwards of a new length of cable can begin.

When the magnetizing coupling is unmagnetized the cable can be pulled forwards as well as backwards through the cable cutter. This renders it possible to pull the cable backwards if a defect is detected so that the defect can be cut away. The length measuring device of the cable consisting of the measuring wheel 5 and electronic components cooperating with this, which are not closer described permits measuring of increasing as well as decreasing lengths when the cable is pulled fowards and backwards past the measuring wheel.

We claim:

1. An arrangement to measure and cut a cable or the like in chosen lengths when rerolling it for delivery, said arrangement comprising rotatable cutting tools, a measuring wheel and a grip-and-pulling-wheel which is pressed against the measuring wheel, characterized in that the grip-and-pulling-wheel of the cable is connected to one of the rotatable cutting tools by means of a clutch mechanism being arranged to be electromagnetically set either to let the grip-and-pulling-wheel pull the cable and to prevent the motion of the cable in the backward direction or to allow the motion of the cable in the forward as well as the backward direction.

* * * * *